United States Patent

[11] 3,565,036

| [72] | Inventors | Marvin Becker<br>276 Newton Turnpike, Wilton, 06897;<br>Harold M. Belmuth, 8 Highwood Lane,<br>Westport, Conn. 06880 |
|---|---|---|
| [21] | Appl. No. | 849,042 |
| [22] | Filed | Aug. 11, 1969 |
| [45] | Patented | Feb. 23, 1971 |

[54] STRIP MATERIAL WITH ELASTOMERIC DEPOSIT
7 Claims, 4 Drawing Figs.

[52] U.S. Cl. .................................................. 118/67,
118/102, 118/119
[51] Int. Cl. ............................................. B05c 11/02
[50] Field of Search ............................................ 118/102,
68, 67, 119

[56] References Cited
UNITED STATES PATENTS

| 1,760,045 | 5/1930 | Dixon............................ | 118/102 |
| 2,191,225 | 2/1940 | Beach........................... | 118/102 |
| 2,304,564 | 12/1942 | Gladding....................... | 118/68 |

*Primary Examiner*—Mervin Stein
*Assistant Examiner*—Leo Mustein
*Attorney*—Myron Amer ABSTRACT: Apparatus for confining a material strip in a partial wrap about a rotating drum between an initial contact point and a takeoff point and, between these points, having appropriate means for depositing and partially curing a strip of elastomeric material on the material strip. An engraved takeoff roller is located at the takeoff point to simultaneously mold a gripping pattern or configuration in the surface of the elastomeric deposit and also divert the strip from continued movement along with the rotating drum.

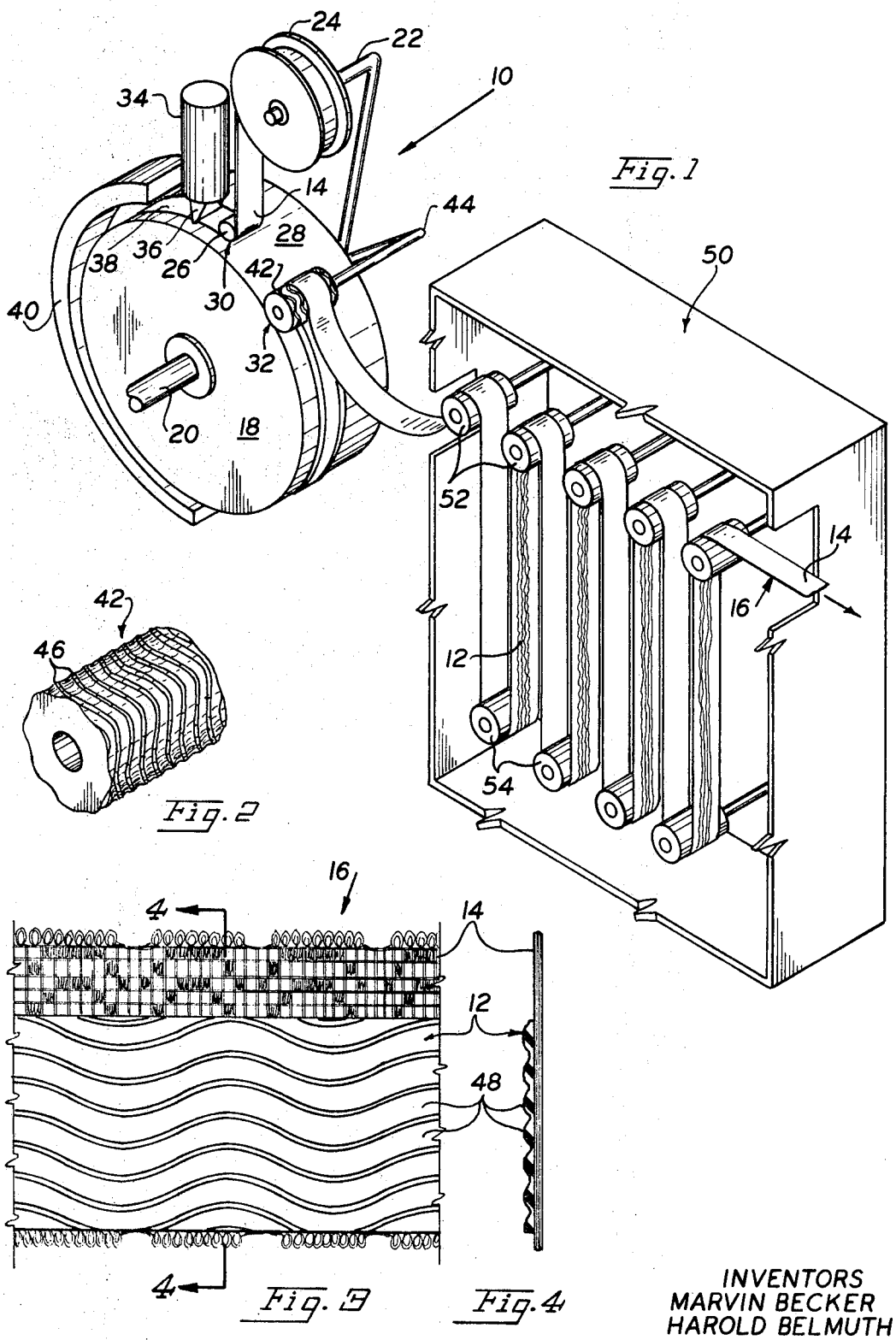

STRIP MATERIAL WITH ELASTOMERIC DEPOSIT

The present invention relates generally to strip material production equipment and more particularly to improved apparatus for providing strip material with a patterned elastomeric deposit thereon.

Strip material with an elastomeric friction gripping surface is useful as a sewn attachment about the leg openings of foundation garments, such as girdles or the like, to engage and prevent falling movement of the user's stockings. There is thus a need for apparatus capable of economic mass production of this composite strip material. Ideally, such apparatus should have a continuous mode of operation to provide the quantity production required, but any apparatus that is operated for long intervals is usually vulnerable to breakdown and malfunction. There is no known strip handling and molding apparatus, apart from the apparatus of the present invention, which is satisfactory in the respects just noted as well as other respects.

Broadly, it is an object to provide a production apparatus for making composite strip material which overcomes the foregoing and other shortcomings of the prior art. Specifically, it is an object to provide a continuously operating apparatus having a characteristically high quantity production capacity and yet of such simple construction and mode of operation that breakdown and malfunction almost never occur.

A production apparatus illustrating objects and advantages of the present invention includes a continuously rotating transporting drum which both supports and transports a partial wrap of the basic strip of material. At appropriate successive stations along the path of movement of the basic strip material, it receives an elastomeric deposit which is then partially cured. This partially cured state of the elastomeric material is ideal for the next step of impressing or molding a friction gripping configuration in the surface of the elastomeric deposit. Moreover, the roller by which the molding is achieved is also effective in diverting the composite strip from the transporting drum along a new path through another heater which then completes the curing of the elastomeric material.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a diagrammatic perspective view of an apparatus for making an elastomeric deposit on strip material, portions of which apparatus are broken away to better illustrate internal structural features thereof;

FIG. 2 is an isolated perspective view of an engraved takeoff roller of the apparatus;

FIG. 3 is a partial plan view, on an enlarged scale, of the product produced by the apparatus in FIG. 1, namely a strip material with a patterned elastomeric deposit thereon; and FIG., 4 is a side elevational view of the composite strip, in section, taken along line 4—4 of FIG. 3.

Reference is made to the drawings, and in particular to FIG. 1 wherein there is shown an apparatus, generally designated 10, demonstrating objects and advantages of the present invention. Specifically, apparatus 10, as will be described in greater detail subsequently herein, is effective in causing the bonding adhesion of a patterned elastomeric deposit 12 lengthwise along one face of an elongated strip material 14 which may be lace or a similar fabrication. The resulting composite material, herein designated 16, consisting of the strip material 14 with a patterned elastomeric deposit 12 on one face thereof, is useful as an attachment sewn about the depending leg openings of foundation garments, such as girdles, to hold and prevent falling movement of the user's stockings. While this is the primary use for the composite material 16, naturally other uses may also be made of this material.

Apparatus 10, which is shown only diagrammatically in FIG. 1, such diagrammatic showing being sufficient, however, for present purposes, has proven to be highly effective in the economical mass production of the just described composite material 16 having the required product features and aspects to serve as an attached stocking-gripping structure. Specifically, apparatus 10 includes a comparatively large diameter drum 18 journaled for rotation about a horizontal axis 20. Mounted on an appropriate support 22 is a supply spool 24 of the elongated strip material 14. The initial setup of the apparatus 10 contemplates the threading of the leading edge of the strip 14 under a guide roller 26 which will be understood to be appropriately mounted in engaging contact against the drum surface 28. The area of contact between the roller 26 and drum surface 28 will be understood to constitute the initial drum-contacting point 30 for the material strip 14.

From reference point 30, strip 14 is provided with a circumferential wrap about the drum 18 up to the takeoff point 32, or in other words a circumferential wrap about the drum 18 of approximately 280°.

Returning again to the threading of the strip 14 about the drum 18, as clearly illustrated in FIG. 1, located adjacent the reference point 30 in the direction of contemplated counterclockwise direction of rotation of the drum 18 is a latex or elastomeric depositing device 34 which is located above the path taken by the strip 14. As a consequence, a selected quantity of the previously referred to elastomeric material 12 flows by gravity through a depositing configuration 36 depending from the device 34 and having an appropriate exit opening in facing relation to the strip 14 which passes beneath it. That is, an appropriately viscous supply of latex or elastomeric material is stored within the device 34 and is permitted to flow out of the depositing configuration 36 onto the upper facing surface of the strip 14. At this time the elastomeric deposit which is placed on the strip 14, designated 38 in FIG. 1, is smooth and completely devoid of any significant surface undulations or the like.

The strip 14 with the smooth elastomeric deposit 38 thereon next encounters an arcuate shaped heating element 40 preferably extending, as illustrated in FIG. 1, through approximately 180° of the path of travel of the strip 14 about the drum 18. Heating element 14 will be understood to be conventional and readily obtainable from many sources and is effective, by virtue of its clearance position adjacent the freshly deposited elastomeric material 38 throughout 180° of the circumferential wrap of the strip 14, of causing a partial curing of the elastomeric material 38.

Finally, the partially cured elastomeric deposit 38 on the strip 14 arrives at that point of rotation during transport on the drum 18 where it encounters an engraved takeoff roller 42 appropriately journaled for rotation on an appropriate support 44. As previously noted, takeoff roller 42 is pressed into engagement against the drum 18 to establish the strip takeoff reference point 32.

As is best illustrated in FIG. 2, roller 42 has an engraved outer surface which in the illustrated embodiment consists of undulating depressions 46 spaced across the roller surface. Consequently, contact of the roller 42 with the partially cured elastomeric material 38 results in molding of a patterned surface in the deposit 38, such surface being the previously noted surface 12. That is, in the areas coextensive with the depressions 46, the resulting patterned elastomeric surface 12 has raised ridges 48, all as is clearly illustrated in FIGS. 3, 4. The ridges 48 contribute in an obvious manner to increasing the gripping contact of the elastomeric deposit 12 against the wearer's stockings to prevent falling movement of the stockings.

Not only does the takeoff roller 42 produce a molded surface in the deposit 12, but this roller by virtue of its engraved surface including the depressions 46 also efficiently functions to divert the strip 14 from continued movement with the rotating drum 18. In other words, as a result of the elastomeric material filling the depressions 46, the gripping contact of the roller 42 with the strip 14 exceeds the gripping contact of the drum surface 28 with the smooth underside of the strip 14 with the result that the composite strip 14 follows the directional movement of the takeoff roller 42 rather than continued rotational movement of the drum 18.

The composite strip material 16 is easily stripped, however, from the takeoff roller 42 and process through a separate heating element 50. As illustrated, heating element 50 preferrably consists of an enclosure having an upper series and a lower series of guide rollers 52, 54 respectively, about which rollers the composite strip material is operatively arranged in festoon fashion. During the run of the composite strip 16 through the heating element 50 it is subjected to the additional quantity of heat necessary to result in total curing of the patterned elastomeric deposit 12. This curing not only preserves the undulating gripping shape of the deposit 12 but also completes the bonding adhesion of the deposit throughout the interstices of the supporting fabric strip 14.

A latitude of modification, change and substitution is intended in the foregoing disclosure and in some instances some features of the invention will be employed without a corresponding use of other features.

We claim:

1. An apparatus for making an elastomeric deposit on strip material comprising a comparatively large diameter rotatable drum, means maintaining a supply of said strip material in a partial circumferential wrap about said drum between an initial drum-contacting point and a terminating strip takeoff point, an elastomeric depositing means located adjacent said initial drum-contacting point effective to continuously deposit a selected amount of elastomeric material on said strip material, heating means located adjacent and in facing relation to said strip material partial circumferential wrap for selective length portion thereof effective to product partial curing of said elastomeric deposit, and a rotatable takeoff roller having a discontinuous molding surface located at said strip takeoff point operatively arranged in molding contact with said elastomeric deposit, whereby said takeoff roller simultaneously molds and grippingly engages said elastomeric deposit to correspondingly produce a gripping surface pattern therein while diverting said strip material from continued movement with said rotatable drum.

2. An apparatus for making an elastomeric deposit on strip material as defined in claim 1 including additional heating means operatively arranged to receive said combined strip material and elastomeric deposit from said takeoff roller.

3. An apparatus for making an elastomeric deposit on strip material as defined in claim 1 wherein said strip material partial circumferential wrap is in excess of 180°.

4. An apparatus for making an elastomeric deposit on strip material as defined in claim 2 wherein said heating means extends adjacent said strip material for at least said initial 90° of wrap thereof.

5. An apparatus for making an elastomeric deposit on strip material as defined in claim 1 wherein said axis of rotation of said large diameter drum is oriented substantially parallel to the horizontal and said initial drum-contacting point is at the point of highest elevation from said horizontal along said drum surface.

6. An apparatus for making an elastomeric deposit as defined in claim 5 wherein said terminating takeoff point is circumferentially spaced at least 270° from said initial drum-contacting point.

7. An apparatus for making an elastomeric deposit on strip material as defined in claim 6 wherein said heating means extends from said initial drum contacting point for approximately 180° in the direction of rotation of said drum.